Dec. 8, 1964 A. LAUDEL, JR., ETAL 3,160,458
WALL OUTLET
Filed March 5, 1962 2 Sheets-Sheet 1
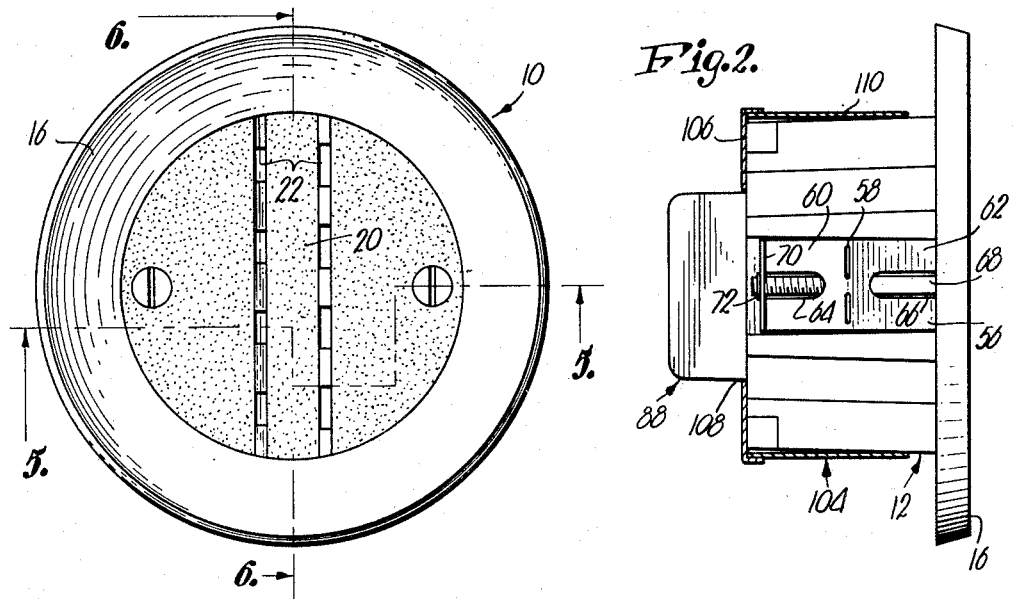
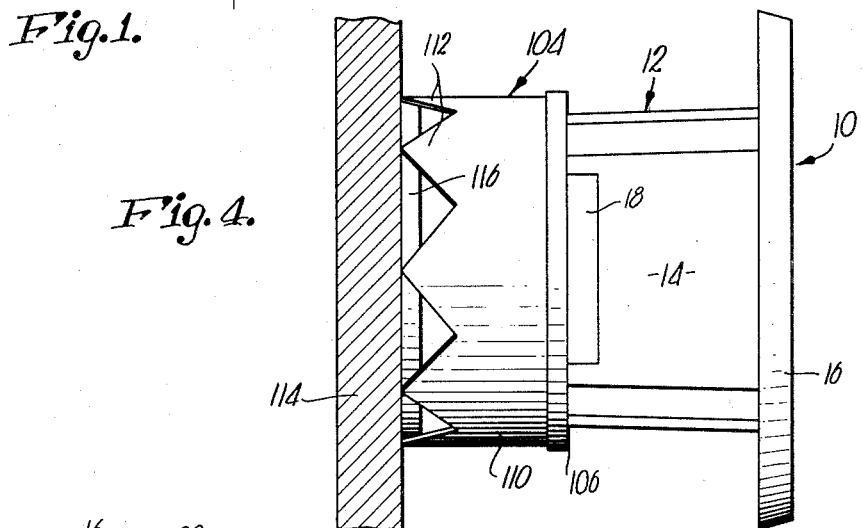
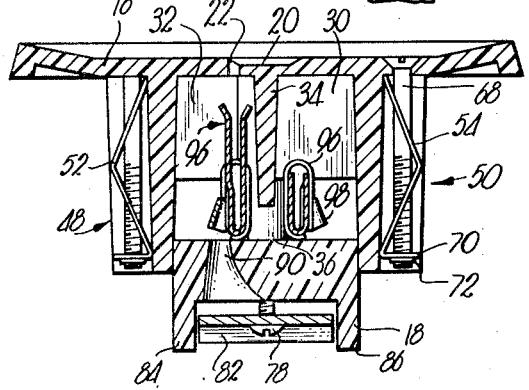
INVENTORS.
Arthur Laudel Jr.
Walter D. Hodge
BY
Hovey, Schmidt, Johnson & Hovey.
ATTORNEYS.

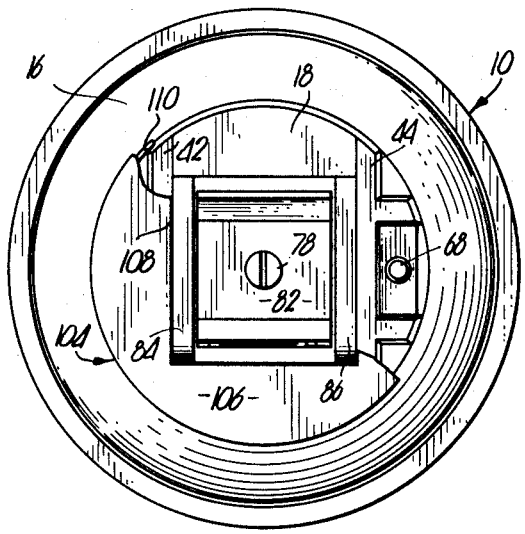
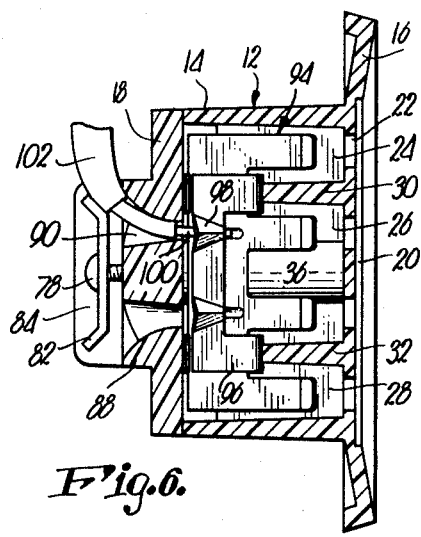
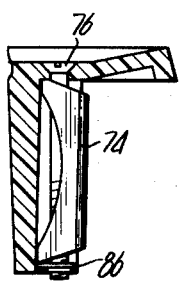
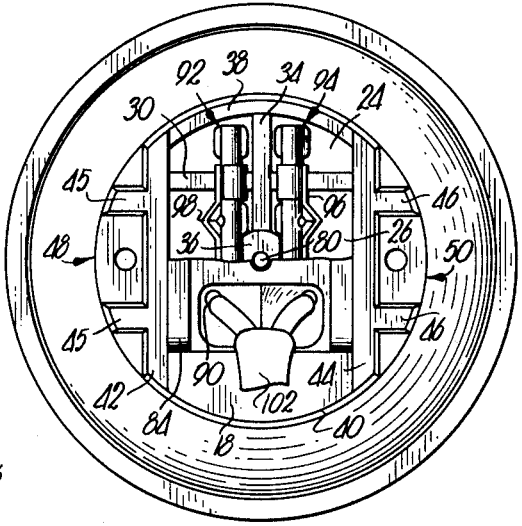
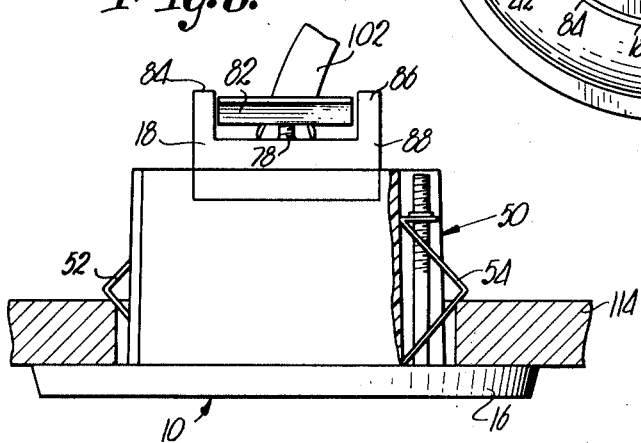

United States Patent Office 3,160,458
Patented Dec. 8, 1964

3,160,458
WALL OUTLET
Arthur Laudel, Jr., Leawood, and Walter D. Hodge, Shawnee Mission, Kans., assignors to Hal Sandy, Inc., Westwood Hills, Kans., a corporation of Missouri
Filed Mar. 5, 1962, Ser. No. 177,476
4 Claims. (Cl. 339—147)

This invention relates to an electrical wall outlet, and more particularly, to such an outlet formed as an integral unit and sold as part of a kit including a cutter element which allows easy installation of the wall outlet.

In the installation of a conventional wall outlet box of the standard rectangular configuration, a series of steps are necessary, involving the use of a number of tools. Such steps usually include, for instance, the use of a drill and a keyhole saw to form the desired opening and the use of a square to insure the proper disposition, shape and alignment of the opening. Once the opening has been satisfactorily formed, the outlet box is installed therein by the use of screws which engage the material surrounding the opening, which material many times is not of sufficient strength to suitably receive and hold the screws and thereby the outlet box. As is apparent, the installation of a conventional wall outlet is a time-consuming and tedious task if done properly, and involves the proper use of a number of separate tools.

Accordingly, it is the primary object of this invention to provide a one-piece electrical wall outlet box which is packaged as part of a kit, which kit also includes a cutter element adapted to be operated by the outlet box to form the opening for receiving the box in a simple, one-step operation, whereby the contents of the kit, plus a screwdriver may be utilized to perform all steps necessary for the installation of the box.

It is a yet further aim of this invention to provide an electrical wall outlet comprising a hollow body having apertured front and back plates, the side walls of the body having opposed flanges formed thereupon and extending outwardly therefrom whereby to define channels for the reception of retaining means, which means are utilized, subsequent to the insertion of the box in a wall, to retain the box in a fixed position with respect to the wall, through engagement with the inner surface of the wall.

Another object is to provide retaining means for a wall outlet box which means are in the form of distortable strips of material which are normally disposed within the confines of corresponding channels, but which, upon distortion thereof through suitable adjusting means, assume a V-shaped configuration with a portion thereof being drawn into tight engagement with a surface of the wall within which the box is received.

A yet further object of this invention is to provide an electrical wall outlet box having a contact assembly disposed interiorly thereof, there being apertures in the backplate of a funnel-shaped configuration whereby the wires to be connected to the box may be merely inserted through said apertures and brought into the necessary engagement with the contact assembly.

Another aim of this invention is the provision of an electrical wall outlet box wherein the back wall thereof has a protrusion formed thereon, the protrusion being of such a size and configuration as to fittingly engage an opening provided in the center of a cup-shaped cutter element, whereby the cutter element may be disposed with the bottom thereof overlying the back wall of the outlet box and the sides thereof embracing the side wall of the box when the cutter element and wall outlet box are packaged as a unit for shipment or sale. It is also intended that the cutter element may be removed from its embracing relationship with the rear portion of the box and reversed, thereby disposing the free edge thereof outwardly with respect to the box with the opening in the bottom of the cutter element receiving the protrusion on the back wall of the box, thus allowing the box itself to be used as a wrench to rotate the cutter element and thereby cut a hole through wallboard or the like within which the electrical wall outlet is to be installed.

Other objects of this invention include details of construction which will become apparent from the following specification and accompanying drawings, wherein:

FIGURE 1 is a front elevational view of the wall outlet box;

FIG. 2 is a side elevational view thereof, the cutter element being shown in section and embracing the box;

FIG. 3 is a rear elevational view thereof also showing the cutter embracing the outlet box, portions of the cutter being broken away;

FIG. 4 is a side elevational view showing the manner in which the wall outlet box is utilized with the cutter element to form a hole in wallboard or the like;

FIG. 5 is a sectional view taken on line 5—5 of FIG. 1;

FIG. 6 is a sectional view taken on line 6—6 of FIG. 1;

FIG. 7 is a rear elevational view with parts broken away and removed for purposes of illustration;

FIG. 8 is a top plan view of the wall outlet box in its installed position; and

FIG. 9 is a fragmentary, sectional view showing a modified form of retaining means.

The wall outlet box forming the subject of this invention is broadly designated by the numeral 10 and includes, as its primary components, a hollow body 12, defined by a side wall 14, the hollow body 12 being closed at its normally front end by a faceplate 16, which plate 16 is formed integrally with side wall 14. The normally rear portion of body 12 is closed by a backplate or wall 18 which likewise may be formed integrally with side wall 14.

The faceplate 16, in the form chosen for illustration, is circular in configuraion and includes a depressed area 20, which has a plurality of apertures 22 therein, said apertures being adapted to receive the prongs of a plug. If desired, the peripheral edge of faceplate 16 may be provided with serrations for easier handling thereof during operations which will hereinafter be described.

The interior of hollow body 12 is divided into three chambers 24, 26 and 28 by means of a pair of transverse partitions 30 and 32, said chambers 24, 26 and 28 each being in turn divided into a pair of chambers by a longitudinal vertical partition 34. A boss 36 is disposed centrally of the hollow body 12 and forms a part of partition 34.

As best seen in FIG. 7, the side wall 14 of hollow body 12, has a pair of opposed arcuate sections 38 and 40 and disposed therebetween a pair of flattened stretches 42 and 44, said stretches 42 and 44 being in opposed relationship and each having a pair of outwardly extending flanges 45 and 46 respectively formed thereon.

The pair of flanges 45 and 46 on each flattened stretch 42 and 44 respectively, serve to define a pair of opposed channels 48 and 50. Each channel 48 and 50 receives therewithin, a corresponding retaining member 52 and 54 respectively. In the preferred embodiment, retaining members 52 and 54 each consist of a substantially V-shaped strip of metal such as 56, having a line of weakness 58 intermediate its ends and dividing the strip 56 into two legs 60 and 62, as best seen in FIG. 2. Each leg 60 and 62 is slotted as at 64 and 66 respectively, whereby an adjusting screw 68 may pass through said slots 64 and 66. The normally rearmost portion of leg 60 of each strip 56 has a laterally extending tab 70 which has a tapped hole 72 therein for receiving the threaded end of screw 68, whereby upon rotation of screw 68, the strip 56 is distorted from its original position, as shown in FIG. 5, where it lies within the confines of its corresponding channel, to its gripping position, as shown in FIG. 8, the distortion being accomplished by pulling legs 60 and 62 toward one another and bending the strip along line of weakness 58, all by means of rotation of screw 68. Longitudinal and lateral movement of strip 56 during such distortion, is prevented by faceplate 16 which engages the free end of leg 62, and by the flanges 45 or 46 which define the channel within which strip 56 rests.

In the modified form of the invention as shown in FIG. 9, the retaining means consists of a rubber-like, resilient element 74 positioned similarly to strips 56 and having suitable slots therein for reception of an adjusting screw 76 whereby, upon rotation of screw 76, element 74 is distorted to assume a substantially V-shaped configuration and move out of the confines of its channel whereby to retain the box 10 in position within a wall.

Backplate or wall 18 which closes the normally rearmost end of hollow body 12, has a central opening therethrough for reception of a screw 78, said screw being received within a hole 80 formed in boss 36, the screw 78 holding a wire clamp plate 82 in position between a pair of outwardly extending members 84 and 86 which form a part of a protrusion 88 formed on the backplate 18. As best seen in FIG. 6, backplate or wall 18 has a plurality of funnel-shaped guide holes 90 formed therein for purposes which will hereinafter be made apparent.

Disposed interiorly of body 12 are a pair of contact assemblies broadly designated as 92 and 94, said contact assemblies being held in position by means of engagement with partition 34 and partitions 30 and 32. Each contact assembly 92 and 94 is identical in construction and is formed from sheet material of a relatively low resistance such as phosphor bronze, the sheet material being configured as best shown in FIG. 6 whereby the same may receive the prongs of a plug passed through apertures 22 in faceplate 16 and thus carry current to the plug. Each contact assembly carries a clamping member such as 96, said clamping member being of a substantially U-shaped configuration and having the legs thereof wrapped partially about the current-carrying portion of its corresponding contact assembly 92 and 94. The bight portion of clamp member 96 is disposed adjacent the rear wall 18 and has formed therein a plurality of raised portions such as 98. Clamp means 96 is preferably formed from a resilient material such as spring steel and, therefore, serves to hold the bared end 100 of cable 102 which supplies current to the wall outlet 10 in a position clamped tightly against the conducting portion of the contact assemblies 92 and 94.

The wall outlet box 10 hereinabove described is intended to be packaged as part of a kit and it is further intended that said kit shall include a cutter element 104 of substantially cup-shaped configuration, the bottom 106 of said cutter element 104 having an opening 108 formed therein, which opening 108 is of such a configuration as to complementally and fittingly receive the protrusion 88 formed on the back wall 18 of the outlet box. Cutter element 104 has a side wall 110 of cylindrical configuration in the form here chosen for illustration, the side wall 110 being provided, at its free edge, with a plurality of cutting teeth 112.

As is illustrated in FIG. 2, the cutter element 104 may be packaged with the wall outlet box 10 in such a manner that the protrusion 88 extends through opening 108, allowing the bottom 106 to overlie back wall 18 of box 10 and the side wall 110 of cutter element 104 to substantially embrace the side wall 14 of the wall outlet box 10 including flanges 45 and 46. With the wall outlet box 10 and the cutter element 104 in this position, it will be appreciated that a compact unit is presented for shipment and storage, which unit nevertheless contains all of the parts necessary to allow installation of the wall outlet box in its desired position.

On the other hand, when it is desired to form an opening in a sheet of wallboard 114 or the like, the cutter element 104 may be removed from its position embracing box 10 and reversed, whereby the protrusion 88 still extends through the opening 108 in the bottom wall 106 of cutter element 104, but the teeth 112 are positioned outwardly with respect to the outlet box 10. In this position, and inasmuch as protrusion 88 tightly engages the edges of opening 108, the wall outlet box may be used to rotate the cutter element 104 and thus form a hole in wallboard 114.

Thus, in operation, the above described unit is used as follows: A template 116 which may either be provided as a part of the aforementioned kit, or which may be obtained independently, is secured to one face of the wallboard 114 by a nail, adhesive or other suitable means whereby to define the opening desired in the wallboard 114. The cutter element 104 is then removed from its packaged position with respect to outlet box 10 and disposed in the position shown in FIG. 4 of the drawings. Once disposed in this position, cutter element 104 may be actuated by gripping the edges of faceplate 16 and rotating the entire unit whereby to cause the teeth 112 to cut a hole through the wallboard 114. Manifestly, this operation would be aided by the provision of serrations upon the peripheral edge of faceplate 16 and accordingly, they may be provided if so desired, in the construction of the subject invention.

Subsequent to the formation of the hole in wallboard 114, the cutter element 104 and template 116 can be discarded. The cable 102 which is adjacent the hole formed in the wallboard 114, can then be stripped pursuant to predetermined instructions, and the bared ends 100 of cable 102 can be inserted through the desired guide holes 90 formed in backplate 18, which holes 90, being substantially funnel-shaped, guide the bared ends 100 to a position beneath the raised portions 98 of clamp member 96, whereby the clamp member being of a resilient material 96, may tightly press the bared ends 100 against the current carrying portion of contact assemblies 92 and 94. It will be appreciated in this regard that funnel-shaped holes 90 cooperate with raised portions 98 of clamp members 96 to allow easy, but positive insertion of the bared ends 100 of cable 102 and to insure that said bared ends are in such a position as to complete a satisfactory electrical connection.

Once the outlet box has been wired as above mentioned, the clamping plate 82 is tightened by means of screw 78 to insure a proper reinforcement of the coupling between cables such as 102, and the wall outlet box 10.

The wall outlet box is then inserted within the opening provided in wallboard 114 in the manner above described, and subsequent to its installation, the screws 68 are suitably rotated by a screwdriver or the like to cause the retaining members 52 and 54 to assume the position shown in FIG. 8 of the drawings, whereby there is a clamping action between the retaining members 52 and 54 and the inner surface of the wallboard 114, and specifically between one surface of leg 62 and the inner surface of wallboard 114.

The operation of the modified form shown in FIG. 9 is substantially the same, for upon rotation of screw 76, the member 74 assumes a substantially V-shaped configuration and is brought into engagement with the inner surface of the wallboard 114. Manifestly, a tight clamp can be secured between the wall outlet box 10 and the wall in which it is inserted, and yet if it is necessary to adjust the alignment of the box in the wall, the adjusting screws such as 68 or 76 can be loosened, the necessary adjustment made, and the screws re-tightened.

Thus, there is presented a wall outlet box and cutter element combination which can be packaged as a kit and which kit provides an easily installable wall outlet, together with the major tools required for the installation thereof. The subject wall outlet box can be formed from metal components if so desired, or may be molded from a suitable plastic whereby to form a unit which is attractive in appearance and which will be highly satisfactory for use in pre-existing structures.

Having thus described the invention, what is claimed as new and desired to be secured by Letters Patent is:

1. An electrical wall outlet kit comprising: an outlet housing having side walls, a faceplate and a backplate, said plates defining apertured front and back walls for said housing respectively; a protrusion on the normally outermost face of said back wall; and a cup-shaped cutter element having an opening in the bottom thereof for fitted reception of said protrusion, said element embracing the side walls of said housing with the protrusion extending through said opening when the kit is packaged for sale.

2. An electrical wall outlet kit assembly comprising: an outlet housing having side walls, a faceplate and a backplate, said plates defining apertured front and back walls for said housing; a protrusion on the normally outermost face of said back wall; and a cup-shaped cutter element having an opening in the bottom thereof for fitted reception of said protrusion and a plurality of teeth at its free edge whereby when said cutter element is positioned with the teeth thereof facing outwardly, said housing may be used to rotate said cutter element to form an opening in a wall, said cutter element being of a size sufficient to form an opening to receive said housing for mounting in the wall.

3. A receptacle kit assembly comprising: a housing have side walls, a faceplate and a backplate, said plates defining front and back walls for said housing; a protrusion on the normally outermost face of said back wall; and a cup-shaped cutter element having an opening in the bottom thereof for fitted reception of said protrusion and a plurality of teeth at its free edge, said element embracing the side walls of said housing with the protrusion extending through said opening and the teeth extending toward said faceplate when the kit is packaged for sale, said teeth extending away from said faceplate and said backplate when said cutter element is positioned for use whereby said housing may be used to rotate said cutter element.

4. An electrical wall outlet kit assembly comprising: a substantially cylindrical housing; a faceplate integral with one end of said housing and of a diameter greater than that of said housing, there being a plurality of apertures in said faceplate and in communication with the interior of said housing; a contact assembly carried interiorly of said housing; a backplate closing the other end of said housing, said backplate having a plurality of apertures therein for guiding a length of wire therethrough and into engagement with the contact assembly; a pair of spaced apart members on the normally outermost face of said backplate, said members cooperating to define a protrusion; a clamping member adjustably secured to said housing and positioned between said spaced apart members and in overlying relationship to said apertures in the backplate; means for retaining said housing in a fixed position relative to a wall; and a cup-shaped cutter element having an opening in the bottom thereof for fitted reception of said protrusion and a plurality of teeth at its free edge, said element embracing said housing with the protrusion extending through said opening and the teeth extending toward said faceplate when the kit is packaged for sale, said teeth extending away from said faceplate and said backplate when said cutter element is positioned for use whereby said housing may be used to rotate said cutter element.

References Cited by the Examiner
UNITED STATES PATENTS

| | | | |
|---|---|---|---|
| 32,888 | 7/61 | Parks | 145—120 |
| 989,853 | 4/11 | Kruse | 339—103 |
| 1,295,734 | 2/19 | Greubel. | |
| 1,623,813 | 4/27 | Schell. | |
| 2,491,742 | 12/49 | Lein. | |
| 2,771,501 | 11/56 | Despard | 339—103 X |
| 2,779,361 | 1/57 | McKiff | 145—120 X |
| 2,865,010 | 12/58 | Taylor. | |
| 3,041,570 | 6/62 | Simerl | 339—12 X |
| 3,046,516 | 7/62 | Tymkewicz | 339—126 |

FOREIGN PATENTS

| | | |
|---|---|---|
| 156,068 | 4/54 | Australia. |
| 739,773 | 1/44 | Germany. |

JOSEPH D. SEERS, *Primary Examiner.*